United States Patent
Aono

(10) Patent No.: US 10,712,246 B2
(45) Date of Patent: Jul. 14, 2020

(54) SAMPLE INTRODUCING DEVICE AND ANALYZING DEVICE PROVIDED THEREWITH

(71) Applicant: SHIMADZU CORPORATION, Kyoto-shi, Kyoto (JP)

(72) Inventor: Akira Aono, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 316 days.

(21) Appl. No.: 15/143,702

(22) Filed: May 2, 2016

(65) Prior Publication Data

US 2017/0315025 A1 Nov. 2, 2017

(51) Int. Cl.
| G01N 1/42 | (2006.01) |
| G01N 30/12 | (2006.01) |
| G01N 1/44 | (2006.01) |
| G01N 35/10 | (2006.01) |
| G01N 30/20 | (2006.01) |
| G01N 30/24 | (2006.01) |

(52) U.S. Cl.
CPC .......... G01N 1/42 (2013.01); G01N 1/44 (2013.01); G01N 30/12 (2013.01); G01N 35/1095 (2013.01); G01N 30/24 (2013.01); G01N 2030/128 (2013.01); G01N 2030/207 (2013.01)

(58) Field of Classification Search
CPC .............................. G01N 1/2202; G01N 30/32
USPC ....................................................... 73/23.41
See application file for complete search history.

(56) References Cited

U.S. PATENT DOCUMENTS

| 8,414,832 B1 * | 4/2013 | Roques ................. G01N 30/30 422/89 |
| 2006/0144126 A1 * | 7/2006 | O'Brien ............... G01N 1/2202 73/23.42 |
| 2013/0055791 A1 * | 3/2013 | Sotomaru ............. G01N 30/12 73/23.41 |
| 2015/0219532 A1 * | 8/2015 | Aono .................... G01N 1/2202 73/863.12 |

FOREIGN PATENT DOCUMENTS

JP 2007-212325 A 8/2007

* cited by examiner

*Primary Examiner* — John Fitzgerald
*Assistant Examiner* — Rodney T Frank
(74) *Attorney, Agent, or Firm* — Sughrue Mion, PLLC

(57) ABSTRACT

A carrier gas flow path of at least from a trap to an analyzing portion is shared between a state wherein a sample component is trapped within the trap and a state wherein the sample component is not trapped within the trap. In this case, even after the sample has been introduced into the analyzing portion through the carrier gas flow path, there is a time interval over which the carrier gas flows within the carrier gas flow path. This makes it possible, through the carrier gas that flows within the carrier gas flow path afterward, to remove the sample component from within the flow path, despite there being a sample component within the carrier gas flow path at the time of sample introduction, thus making it possible to prevent the sample component from remaining within the flow path after sample introduction.

5 Claims, 8 Drawing Sheets

SAMPLE INTRODUCING DEVICE AND ANALYZING DEVICE PROVIDED THEREWITH

TECHNICAL FIELD

The present invention relates to a sample introducing device for introducing a sample into an analyzing portion, and to an analyzing device equipped therewith.

BACKGROUND ART

Sometimes a sample introducing device of a heated desorption system is used when introducing trace amounts of sample components into an analyzing portion, such as when analyzing, for example, airborne environment contaminants (referencing, for example, Patent Document 1, below). In this type of sample introducing device, a sample component that is filled into a sample tube is desorbed through heating, to then trap the sample component within a trap, after which the sample component within the trap is desorbed through heating, to be introduced into the analyzing portion.

FIG. 2A through FIG. 2D are diagrams illustrating an example configuration of a sample introducing device 100 of a conventional heated desorption system. In this sample introducing device 100, an internal reference sample is introduced into an analyzing portion 200 and the result of a measurement of this internal reference sample is used to enable correction of the measurement results of the samples that are subject to measurement.

The sample introducing device 100 comprises an internal reference sample supplying portion 101, a carrier gas supplying portion 102, a sample loop 103, a sample tube 104, a trap 105, an eight-way valve 106, a four-way valve 107, a three-way valve 108, a plurality of two-way valves 111 through 116, and a plurality of flow rate controlling portions 121 through 123. These portions are all connected together through pipes.

FIG. 2A illustrates the state wherein a sample loop is supplied, wherein the internal reference sample is supplied into a sample loop 103. FIG. 2B illustrates the state wherein a sample tube is supplied, wherein an internal reference sample within a sample loop 103 is supplied into a sample tube 104. FIG. 2C illustrates the state wherein the trap is supplied, wherein a sample component that is desorbed from within the sample tube 104 is supplied into a trap 105. FIG. 2D illustrates the state wherein the analyzing portion is supplied, for supplying, to the analyzing portion 200, a sample component that has been desorbed from within the trap 105.

In this sample introducing device 100, first, as illustrated in FIG. 2A, in a state wherein the internal reference sample supplying portion 101 and the sample loop 103 are connected by the eight-way valve 106, the two-way valve 111 is opened. As a result, as illustrated by the dotted line in FIG. 2A, the internal reference sample flows, due to the pressure thereof, from the internal reference sample supplying portion 101 side to the two-way valve 111 side, to fill into the sample loop 103.

Thereafter, as illustrated in FIG. 2B, the eight-way valve 106 is switched to produce a state wherein the carrier gas supplying portion 102, the sample loop 103, the sample tube 104, and the flow rate controlling portion 121 are connected. In this case, the two-way valve 112 is closed and the two-way valve 113 is opened. Through this, as illustrated by the dotted line in FIG. 2B, the carrier gas that is supplied from the carrier gas supplying portion 102, traverses sequentially the sample loop 103 and the sample tube 104, to flow to the flow rate controlling portion 121 side.

In the state illustrated in FIG. 2B, the sample component of the internal reference sample within the sample loop 103 is trapped within the sample tube 104, so the sample component is filled into the sample tube 104. The flow rate of the carrier gas from the carrier gas supplying portion 102 into the sample loop 103 and the sample tube 104 can be controlled by the flow rate controlling portion 121.

As illustrated in FIG. 2C, next the eight-way valve 106 and the four-way valve 107 are switched, and, additionally, the two-way valves 112 and 114 are opened and the two-way valve 113 is closed. As a result, as illustrated by the dotted line in FIG. 2C, a state is produced wherein the carrier gas supplying portion 102, the sample tube 104, the trap 105, and the flow rate controlling portion 122 are connected, and the sample component that is desorbed from within the sample tube 104 is trapped within the trap 105.

The flow rate of the carrier gas from the carrier gas supplying portion 102 into the sample tube 104 and the trap 105 can be controlled by the flow rate controlling portion 122. In this case, the carrier gas from the carrier gas supplying portion 102 is supplied to the analyzing portion 200 through the three-way valve 108, to produce a state wherein the carrier gas supplying portion 102 and the analyzing portion 200 are connected.

After the sample component is trapped in the trap 105 in this way, then, as illustrated in FIG. 2D, the four-way valve 107 is switched and, additionally, the two-way valve 113 is opened and the two-way valves 112 and 114 are closed. In this case, the three-way valve 108 switches to a state wherein the carrier gas supplying portion 102 and the trap 105 are connected.

Through this, as illustrated by the dotted line in FIG. 2D, the carrier gas supplying portion 102 and the trap 105 are connected, and the trap 105 is connected to the analyzing portion 200, through the four-way valve 107, and, additionally, the trap 105 is connected to the sample tube 104 and the flow rate controlling portion 121 through the four-way valve 107. In this state, a portion of the sample component that is desorbed from the trap 105 is introduced into the analyzing portion 200, and the remaining sample component is re-trapped within the sample tube 104.

The flow rate of the carrier gas from the carrier gas supplying portion 102 into the trap 105 and the sample tube 104 can be controlled by the flow rate controlling portion 121. Moreover, a portion of the sample component that is supplied to the analyzing portion 200 side is directed from a branch portion 130 into the flow rate controlling portion 123 side through opening of the two-way valve 115. In this case, a split flow path 131 is structured by the flow path from the branch portion 130 to the flow rate controlling portion 123, enabling control, by the flow rate controlling portion 123, of the flow rate of the carrier gas in the split flow path 131.

PRIOR ART DOCUMENT

Patent Document

[Patent Document 1] Japanese Unexamined Patent Application Publication 2007-212325

SUMMARY OF THE INVENTION

Problem Solved by the Present Invention

However, in the conventional structure, as described above, there is a problem in that the flow path 132 between the four-way valve 107 and the branch portion 130 forms a dead volume. That is, in the state in FIG. 2D, a portion of the sample component that is desorbed from the trap 105 is introduced into the analyzing portion 200 through the flow path 132, but in the other states, in FIG. 2A through FIG. 2C, no gas flows in the flow path 132.

Because of this, there is a problem in that the sample component that remains within the flow path 132 at the time of an analysis is carried over to the time of the next analysis and the sample component from the previous analysis mixes into the gas that is introduced into the analyzing portion 200 through the flow path 132 at the time of the subsequent analysis. In this case, it may not be possible to obtain accurate measurement results, where, for example a peak for a sample component that does not actually exist appears in the measurement result. In particular, with sample components that are difficult to vaporize due to a high boiling point, there is a tendency for residue to remain within the flow path 132, which tends to cause the problem described above.

On the other hand, from the point of view of reducing the manufacturing cost of the equipment and improving maintainability, preferably the number of components is small and the structure is simplified.

The present invention was created in contemplation of the situation set forth above, and an object thereof is to provide a sample introducing device able to prevent a sample component from remaining within the flow path after sample introduction, and to provide an analyzing device equipped therewith. Moreover, an object of the present invention is to provide a sample introducing device wherein the structure is simplified, and to provide an analyzing device provided therewith.

The sample introducing device according to the present invention is for introducing a sample into an analyzing portion, and comprises: a sample tube; a first heating portion; a trap; a second heating portion; a carrier gas flow path; and a first flow path switching mechanism.

A sample component is filled into a sample tube. The first heating portion heats, in order to desorb the sample component that is filled into the sample tube. The trap traps the sample component that has been desorbed from the sample tube. The second heating portion heats and desorbs the sample component within the trap. The carrier gas flow path uses a carrier gas to introduce, into the analyzing portion, the sample component that is desorbed from within the trap. The first flow path switching mechanism switches the carrier gas flow path between a state wherein the sample component is trapped within the trap and a state wherein the sample component is not trapped within the trap. The carrier gas flow path for at least from the trap to the analyzing portion is shared for both the state wherein the sample component is trapped within the trap and the state wherein the sample component is not trapped within the trap.

Because, in this structure, the carrier gas flow path from at least the trap to the analyzing portion is shared for the state wherein the sample component is trapped within the trap and the state wherein the sample component is not trapped within the trap, there will be a period of time wherein the carrier gas flows within this carrier gas flow path even after the sample has been introduced into the analyzing portion through the carrier gas flow path. Through this, despite the sample component being within the carrier gas flow path at the time of the sample introduction, thereafter the sample component is removed from within the flow path, by the carrier gas that flows within the carrier gas flow path, thus making it possible to prevent the sample component from remaining within the flow path after sample introduction.

Moreover, having the carrier gas flow path from at least the trap to the analyzing portion be shared for the state wherein the sample component is trapped within the trap and the state wherein the sample component is not trapped within the trap, makes it possible to reduce the number of components, thus enabling a simplification of the structure. This not only reduces the manufacturing cost of the equipment, but can also improve maintainability thereof.

The sample introducing device may be provided with a split flow path as well. This split flow path introduces, into the sample tube, a portion of the carrier gas that is introduced into the analyzing portion through the trap in a state wherein the sample component is trapped within the trap.

Given this structure, the sample component that is included in the carrier gas that is introduced into the split flow path is trapped within the sample tube. This enables the split flow path to be used to re-trap the sample component within the sample tube, thus enabling a reduction in the number of components and enabling the structure to be simplified further.

The sample introducing device may be provided with a first flow rate controlling portion as well. The first flow rate controlling portion controls the rate of flow of the carrier gas within the split flow path.

Such a structure not only enables the split flow rate to be adjusted through control of the flow rate of the carrier gas within the split flow path, using the first flow rate controlling portion, but also enables an adjustment of the flow rate of the sample component that is re-trapped within the sample tube. In this way, sharing of the first flow rate controlling portion to control the split flow rate and control of the flow rate of the sample component that is re-trapped enables a reduction in the number of components, thus enabling a further simplification of the structure.

The sample introducing device may further comprise an internal reference sample supplying path, a second flow path switching mechanism, and a second flow rate controlling portion. The internal reference supplying path supplies an internal reference sample. The second flow path switching mechanism switches the internal reference sample supplying path between a sample loop supplying state wherein the internal reference sample is supplied into the sample loop, and a sample tube supplying state wherein the internal reference sample within the sample loop is supplied into the sample tube. The second flow rate controlling portion controls the flow rate of the internal reference sample within the internal reference sample supplying path in the sample loop supplying state and the sample tube supplying state.

Such a structure enables control of the flow rate of the internal reference sample within the internal reference sample supplying path in the sample loop supplying state and in the sample tube supplying state, with the second flow rate controlling portion used in common. This enables a reduction in the number of components, thus further simplifying the structure of the device.

The second flow path switching mechanism may have the ability to switch the internal reference sample supplying path to a trap supplying state wherein the sample component that is desorbed from within the sample tube is supplied into the trap. In this case, the second flow path controlling portion may control the flow rate of the internal reference sample within the internal reference sample supplying path in the trap supplying state.

This structure enables control of the flow rate of the internal reference sample within the internal reference sample supplying path, where the second flow rate controlling portion is used in common by the trap supplying state in addition to in the sample loop supplying state and in the sample tube supplying state. This enables a further reduction in the number of components, enabling a further simplification of the structure.

The analyzing device according to the present invention comprises the sample introducing device and an analyzing portion for analyzing a sample introduced by the sample introducing device.

Effects of the Invention

The present invention enables the elimination of a sample component from within the flow path, through a carrier gas that flows within the flow path, enabling the prevention of the sample component remaining within the flow path after a sample is introduced. Moreover, the present invention enables a reduction in the number of components, enabling a further simplification in structure.

DETAILED DESCRIPTION OF THE EXEMPLARY EMBODIMENTS

Figure 1A:
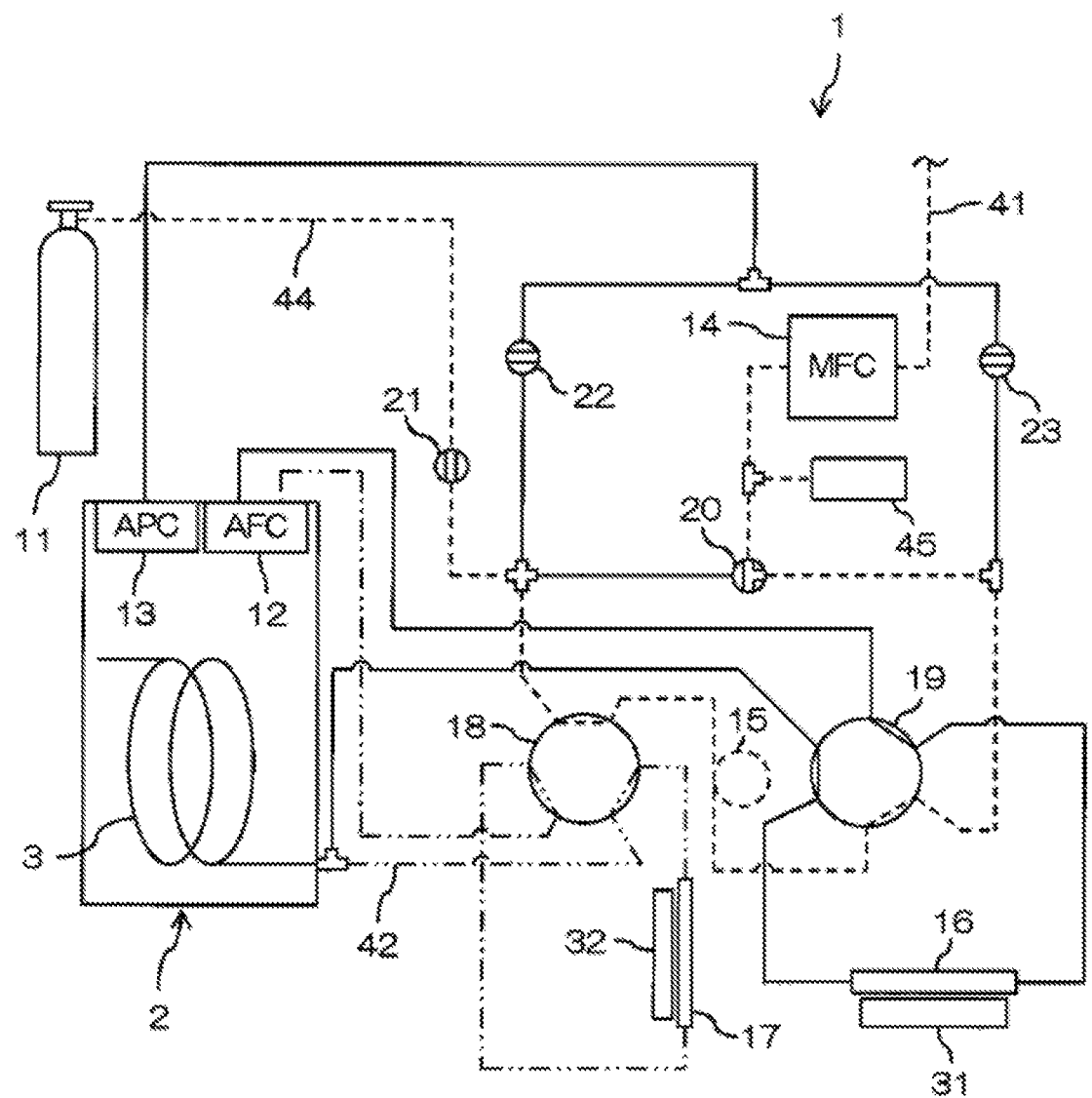
FIG. 1A is a diagram illustrating an example configuration of a sample introducing device of a heated desorption system according to one embodiment according to the present invention, illustrating the sample loop supplying state.

FIG. 1A through FIG. 1D are diagrams illustrating an example configuration of a sample introducing device 1 of a heated desorption system according to one embodiment according to the present invention. In this sample introducing device 1, an internal reference sample is introduced into the analyzing portion 2, thereby enabling the results of measuring the internal reference sample to be used to correct the measurement results for the sample that is subject to measurement. The analyzing portion 2 is, for example, a gas chromatograph that is provided with a column 3, wherein a sample that is introduced from the sample introducing device 1 is analyzed.

The sample introducing device 1 comprises: an internal reference sample supplying portion 11, an AFC (Automatic Flow Controller) 12, an APC (Automatic Pressure Controller) 13, an MFC (Mass Flow Controller) 14, a sample loop 15, a sample tube 16, a trap 17, two six-way valves 18 and 19, a three-way valve 20, and three two-way valves 21 through 23. These various portions are connected together through pipes.

Figure 1B:
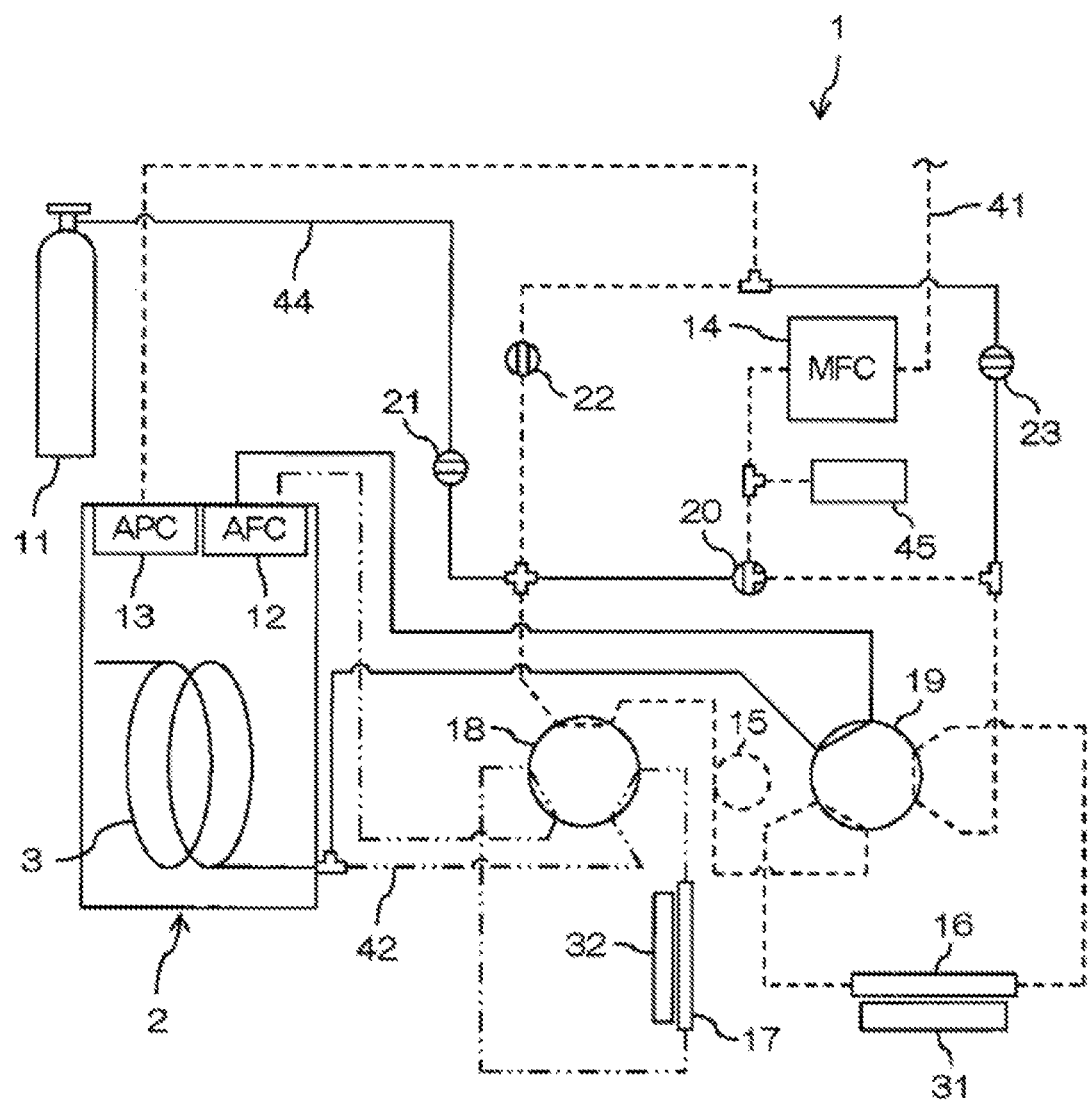
FIG. 1B is a diagram illustrating an example configuration of a sample introducing device of a heated desorption system according to one embodiment according to the present invention, illustrating the sample tube supplying state.
Figure 1C:
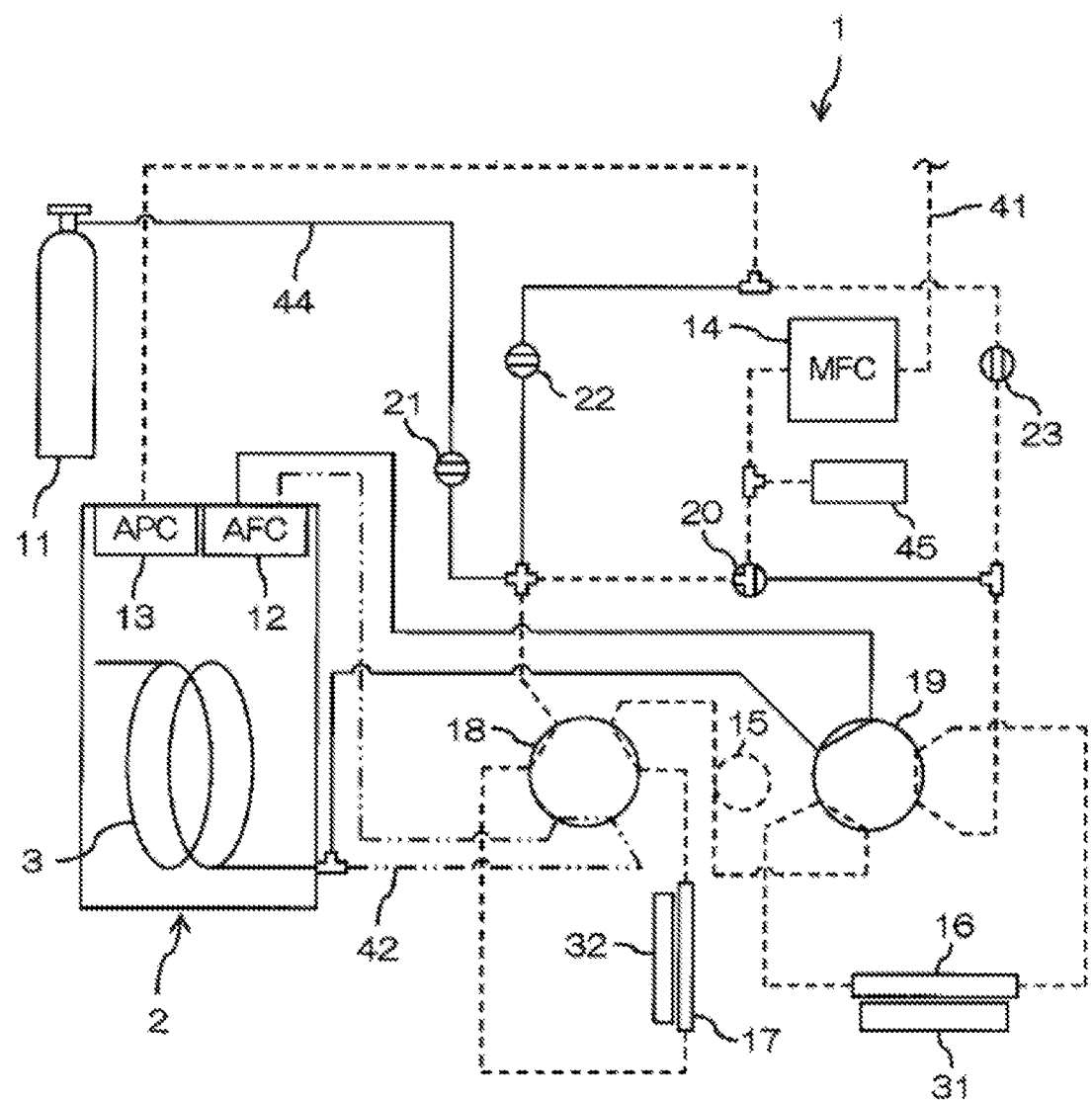
FIG. 1C is a diagram illustrating an example configuration of a sample introducing device of a heated desorption system according to one embodiment according to the present invention, illustrating the trap supplying state.
Figure 1D:
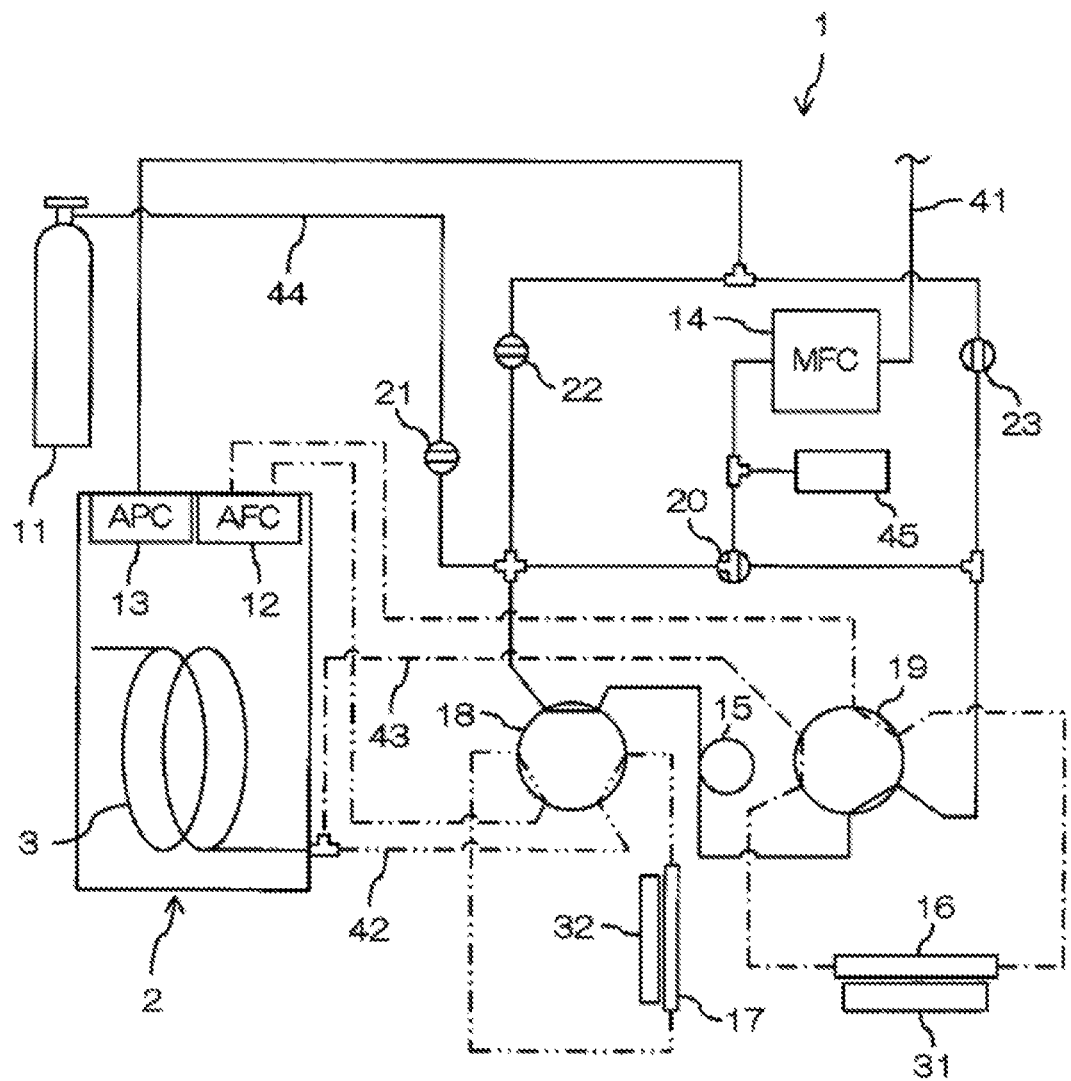
FIG. 1D is a diagram illustrating an example configuration of a sample introducing device of a heated desorption system according to one embodiment according to the present invention, illustrating the analyzing portion supplying state.
Figure 2A:
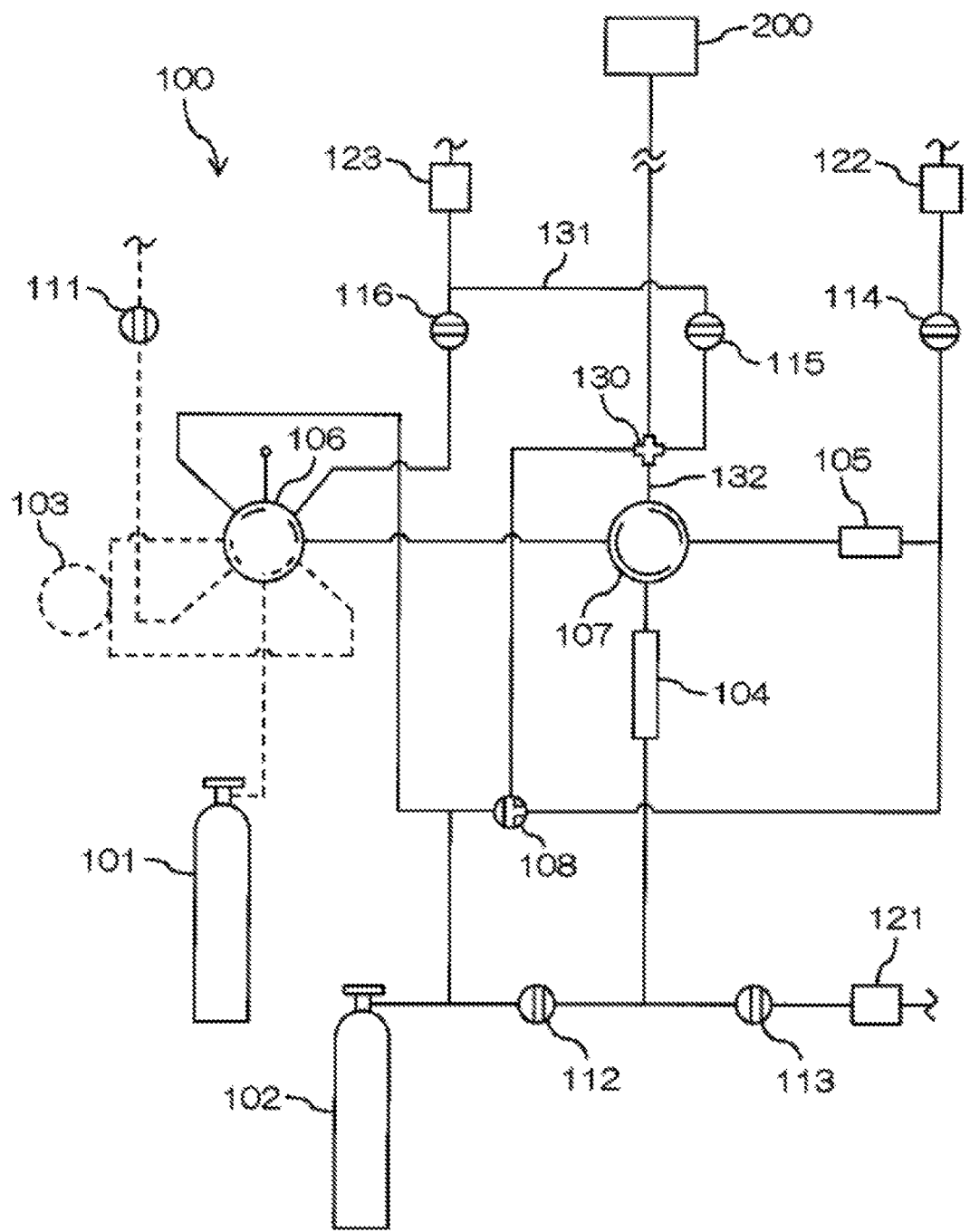
FIG. 2A is a diagram illustrating an example configuration of a sample introducing device of a conventional heated absorption system, showing a sample loop supplying state.
Figure 2B:
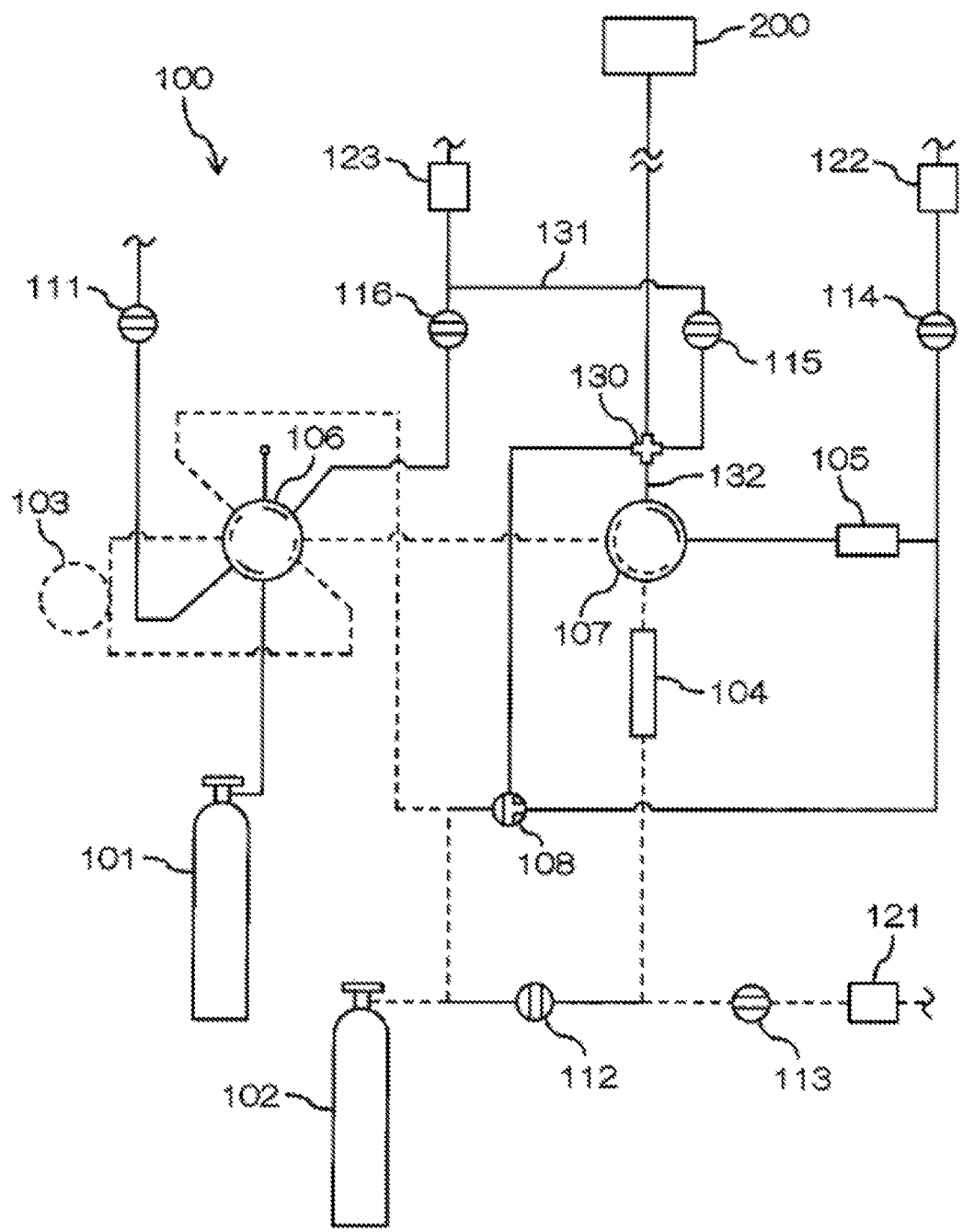
FIG. 2B is a diagram illustrating an example configuration of a sample introducing device of a conventional heated absorption system, showing a sample tube supplying state.
Figure 2C:
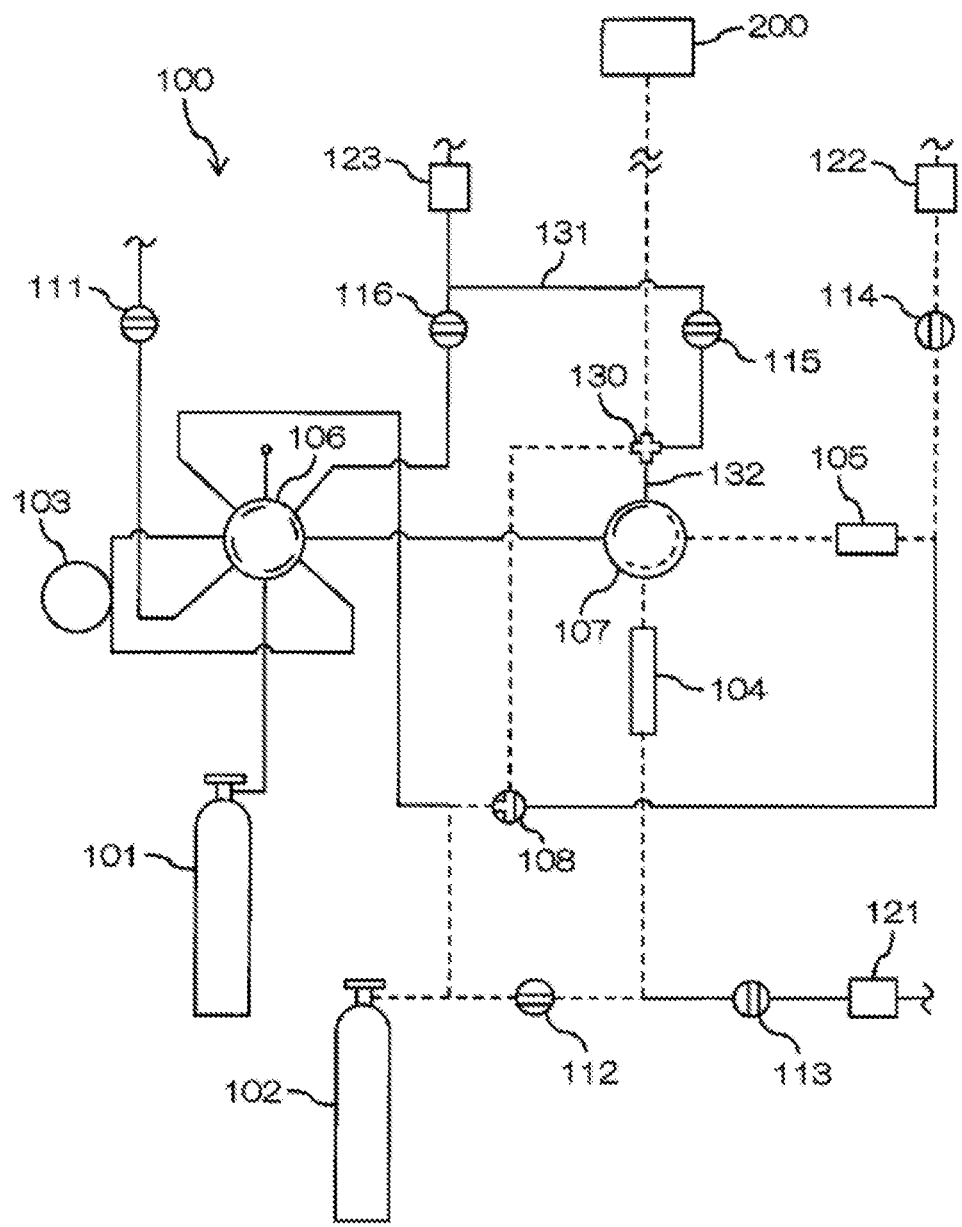
FIG. 2C is a diagram illustrating an example configuration of a sample introducing device of a conventional heated absorption system, showing a trap supplying state.
Figure 2D:
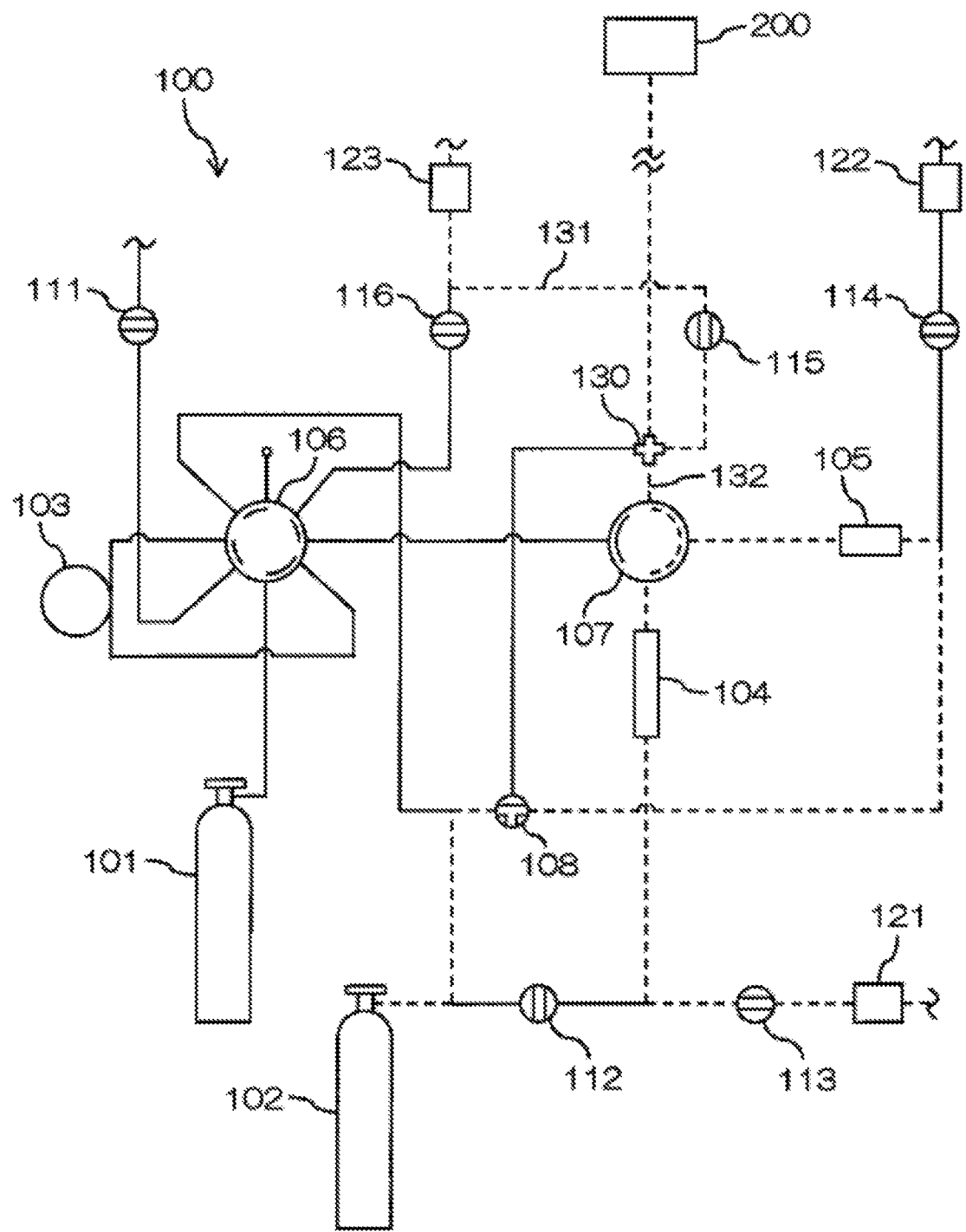
FIG. 2D is a diagram illustrating an example configuration of a sample introducing device of a conventional heated absorption system, showing an analyzing portion supplying state.

FIG. 1A illustrates a sample loop supplying state for supplying the internal reference sample into the sample loop 15. FIG. 1B illustrates the sample tube supplying state for supplying the internal reference sample from within the sample loop 15 into the sample tube 16. FIG. 1C illustrates the trap supplying state for supplying the sample component, desorbed from within the sample tube 16, into the trap 17. FIG. 1D illustrates the analyzing portion supplying state for supplying the sample component desorbed from within the trap 17 into the analyzing portion 2.

The internal reference sample supplying portion 11 is made from, for example, a canister wherein the internal reference sample is contained at a high pressure, wherein the internal reference sample is supplied by the internal pressure. The AFC 12 structures the carrier gas supplying portion, and controls the supply flow rate of the carrier gas for introducing the sample component into the analyzing portion 2. The APC 13 structures the gas supplying portion for the trap, and controls the pressure for supplying the gas for the trap, in order to trap the sample component in the sample tube 16 and the trap 17. The MFC 14 controls the flow rate of the gas that is exhausted to the outside of the device through exhaust gas 41.

In the sample introducing device 1, first, as illustrated in FIG. 1A, in a state wherein the two-way valve 21 is open and the two-way valves 22 and 23 are closed, the internal reference sample supplying portion 11, the sample loop 15, and the MFC 14 are connected together by the six-way valves 18 and 19. Through this, as illustrated by the dotted line in FIG. 1A, the internal reference sample flows, under the pressure thereof, from the internal reference sample supplying portion 11 side to the MFC 14 side, to be filled into the sample loop 15. In this case, carrier gas is supplied from the AFC 12, and the carrier gas is introduced into the column 3 of the analyzing portion 2 through the carrier gas flow path 42, illustrated by the double dotted line in FIG. 1A.

Thereafter, a state is produced wherein the two-way valve 21 is closed and the two-way valve 22 is opened, as illustrated in FIG. 1B. In this state, the flow path is switched by the six-way valve 19 to produce a state wherein the APC 13, the sample loop 15, the sample tube 16, and the MFC 14 are connected sequentially, as illustrated by the dotted line in FIG. 1B. Through this, the gas for the trap, supplied from the APC 13, traverses the sample loop 15 and the sample tube 16 sequentially to the MFC 14 side.

In the state illustrated in this FIG. 1B, the sample component of the internal reference sample within the sample loop 15 is trapped within the sample tube 16, which has been cooled, so that the sample component is filled into the sample tube 16. The flow rate of the gas for trapping in the sample tube 16 can be controlled by the MFC 14. Note that the six-way valve 18 is in the same state as in FIG. 1A, and, as illustrated by the double dotted line in FIG. 1B, the carrier gas is introduced into the column 3 of the analyzing portion 2 from the AFC 12 through the carrier gas flow path 42.

Following this, as illustrated in FIG. 1C, a state is produced wherein the two-way valve 22 is closed and the two-way valve 23 is opened. In this state, the flow path is switched by the six-way valve 18 and the three-way valve 20, to produce a state wherein the APC 13, the sample tube 16, the sample loop 15, the trap 17, and the MFC 14 are connected sequentially, as illustrated by the dotted line in FIG. 1C. Note that the six-way valve 19 is in the same state as in FIG. 1B.

In this case, the sample tube 16 is heated by a heater (first heating portion) 31 that is provided adjacent to the sample tube 16, causing the sample component that is filled into the sample tube 16 to be desorbed. Given this, the gas for trapping, which is supplied from the APC 13, carries the sample component, desorbed from the sample tube 16, to the trap 17 side, and the sample component is trapped within the trap 17, which has been cooled. The flow rate, to the trap 17, of the gas for trapping can be controlled by the MFC 14.

Accompanying the switching of the flow path by the six-way valve 18, the carrier gas flow path 42 from the AFC 12 to the analyzing portion 2 will be in a state that does not traverse the trap 17, as illustrated by the double dotted line in FIG. 1C. In this state, the carrier gas from the AFC 12 is introduced into the column 3 of the analyzing portion 2 through the carrier gas flow path 42.

After the sample component has been trapped within the trap 17 as described above, the flow path is switched by the six-way valves 18 and 19, as illustrated in FIG. 1D. Through this, a state is produced wherein the carrier gas flow path 42 is connected from the AFC 12 through the trap 17 to the analyzing portion 2, as illustrated by the double dotted line in FIG. 1D. In this case, the trap 17 is heated by a heater (a second heating portion) 32 that is provided adjacent to the trap 17, and the sample component within the trap 17 is desorbed. The sample component that has been desorbed from the trap 17 is introduced through the carrier gas flow path 42 to the column 3 analyzing portion 2 by the carrier gas.

As illustrated in FIG. 1A through FIG. 1D, the six-way valve 18 structures a first flow path switching mechanism for switching a carrier gas flow path 42, in the state wherein the sample component is trapped within the trap 17 and the state wherein the sample component is not trapped within the trap 17. In the present embodiment, the carrier gas flow path 42 from at least the trap 17 to the analyzing portion 2 is shared between the state wherein the sample component is trapped within the trap 17 (FIG. 1D) and the state wherein the sample component is not trapped within the trap 17 (FIG. 1A and FIG. 1B).

In this case, even after a sample has been introduced into the analyzing portion 2 through the carrier gas flow path 42 in the state in FIG. 1D, there is a time interval over which the carrier gas flows within the carrier gas flow path 42, as illustrated in FIG. 1A and FIG. 1B. Through this, even if there is a sample component within the carrier gas flow path 42 at the time at which the sample is introduced, the sample component is removed from the flow path through the carrier gas that flows within the carrier gas flow path 42 thereafter, making it possible to prevent the sample component from remaining within the flow path after sample introduction.

Moreover, the carrier gas flow path 42 from at least the trap 17 to the analyzing portion 2 being shared between the state wherein the sample component is trapped within the trap 17 and the state wherein the sample component is not trapped within the trap 17 enables a reduction in the number of components, thus enabling a further simplification in the structure. This not only enables a reduction in the cost of manufacturing the equipment, but also enables an improvement in the maintainability thereof.

In the state in FIG. 1D, a portion of the carrier gas introduced into the analyzing portion 2 through the trap 17 is introduced into the sample tube 16 by the split flow path 43, illustrated by the dotted line in the figure. In this case, the sample component that is included in the carrier gas that is introduced into the split flow path 43 is trapped within the sample tube 16, which has been cooled.

This makes it possible to use the split flow path 43 to re-trap the sample component within the sample tube 16, thereby enabling a reduction in the number of components and enabling a further simplification in structure. Note that if this sample component is not to be re-trapped, then, when moving from the state in FIG. 1C to the state in FIG. 1D, the six-way valve 19 need not be switched.

The side of the split flow path 43 that is downstream of the sample tube 16 is connected to the AFC 12, where the AFC 12 structures a first flow rate controlling portion for controlling the flow rate of the carrier gas within the split flow path 43. Consequently, controlling, through the AFC 12, the flow rate of the carrier gas in the split flow path 43 not only enables the split flow rate to be adjusted, but also enables adjustment of the flow rate of the sample component that is re-trapped within the sample tube 16. The sharing of the AFC 12 in this way to control the split flow rate and the flow rate of the sample component that is re-trapped enables a reduction in the number of components, thus enabling a further simplification of the structure.

The internal reference sample supplying path 44 for supplying the internal reference sample can be switched, by the second flow path switching mechanism that is structured from the six-way valves 18 and 19, between a sample loop supplying state, indicated by the dotted line in FIG. 1A, a sample tube supplying state, indicated by the dotted line in FIG. 1B, and a trap supplying state, indicated by the dotted line in FIG. 1C. The MFC 14 structures the second flow rate controlling portion for controlling the flow rate of the internal reference sample within the internal reference sample supplying path 44 in the sample loop supplying state, the sample tube supplying state, and the trap supplying state. The pressure within the internal reference sample supplying path 44 can be detected by a pressure sensor 45 that is connected to the internal reference sample supplying path 44.

When the internal reference sample supplying path 44 is in the sample loop supplying state, as illustrated by the dotted line in FIG. 1A, the internal reference sample supplied from the internal reference sample supplying portion 11 is supplied into the sample loop 15. When the internal reference sample supplying path 44 is in the sample tube supplying state illustrated by the dotted line in FIG. 1B, then the internal reference sample within the sample loop 15 is supplied into the sample tube 16.

In the present embodiment, the MFC 14 is used jointly in controlling the flow rate of the internal reference sample within the internal reference sample supplying path 44 in both the sample loop supplying state and the sample tube supplying state. This enables a reduction in the number of components, enabling a further simplification of the structure.

When the internal reference sample supplying path 44 is in the trap supplying state indicated by the dotted line in FIG. 1C, the sample component that is desorbed from the sample tube 16 is supplied into the trap 17. In the present embodiment, the flow rate of the internal reference sample within the internal reference sample supplying path 44 is controlled through the joint use of the MFC 14 in the trap supplying state in addition to in the sample loop supplying state and the sample tube supplying state. This enables a further reduction in the number of components, enabling a further simplification in structure.

In the embodiments set forth above, structures by which to use an internal reference sample to correct the result of a measurement on a sample that is subject to measurement have been explained. However, the present invention is not limited to these structures, but rather can be applied also to a structure wherein no internal reference sample is used. In this case, the operations in FIG. 1C forward should be carried out after the sample tube 16 that is filled with the sample component of the sample that is to be subjected to measurement has been attached to the sample introducing device 1.

Moreover, the sample introducing device 1 according to the present invention can be applied not only to an analyzing portion 2 such as a gas chromatograph, but can be applied also to structures such as those for introducing samples into other analyzing portions 2 instead.

EXPLANATIONS OF REFERENCE SYMBOLS

1: Sample Introducing Device
2: Analyzing Portion
3: Column
11: Internal Reference Sample Supplying Portion
12: AFC
13: APC
14: MFC
15: Sample Loop
16: Sample Tube
17: Trap
18, 19: Six-Way Valves
20: Three-Way Valve
21 through 23: Two-Way Valves
31, 32: Heaters
41: Exhaust Path
42: Carrier Gas Flow Path
43: Split Flow Path
44: Internal Reference Sample Supplying Path
45: Pressure Sensor

What is claimed:

1. A sample introducing device for introducing a sample into
an analyzing portion, comprising:
a sample tube filled with a sample component;
a first heating portion for desorbing, through heating, the sample component that is filled within the sample tube;
a trap for trapping the sample component that has desorbed from the sample tube; a second heating portion for desorbing, through heating, the sample component within the trap;
a carrier gas flow path for introducing, through a carrier gas, the sample component that has been desorbed from within the trap into the analyzing portion;
a first flow path switching mechanism, comprising a six-way valve, for switching the carrier gas flow path between a state wherein the sample component is desorbed from the trap and introduced into the analyzing portion and a state after the sample component is introduced into the analyzing portion and the sample component is not trapped within the trap; and
a split flow path for carrying a portion of both the sample component and the carrier gas, that is being introduced from within the trap into the analyzing portion through the carrier gas flow path, into the sample tube, wherein the carrier gas flow path of at least from the trap to the analyzing portion is shared in the state wherein the sample component is desorbed from the trap and is introduced into the analyzing portion and a state after the sample component is introduced into the analyzing portion and the sample component is not trapped within the trap.

2. A sample introducing device as set forth in claim 1, further comprising:
a first flow rate controlling portion, for controlling a flow rate of a carrier gas within the split flow path.

3. A sample introducing device as set forth in claim 1, further comprising:
an internal reference sample supplying path for supplying an internal reference sample;
a second flow path switching mechanism, comprising a six-way valve, for switching the internal reference sample supplying path between a sample loop supplying state for supplying the internal reference sample into the sample loop, and a sample tube supplying state for supplying the internal reference sample within the sample loop into the sample tube; and
a second flow rate controlling portion for controlling a flow rate of the internal reference sample within the internal reference sample supplying path in the sample loop supplying state and the sample tube supplying state.

4. A sample introducing device as set forth in claim 3, wherein:
the second flow path switching mechanism is able to switch the internal reference sample supplying path to a trap supplying state wherein the sample component that has been desorbed from within the sample tube is supplied to the trap; and
the second flow path controlling portion controls a flow rate of the internal reference sample within the internal reference sample supplying path in the trap supplying state.

5. An analyzing device comprising:
a sample introducing device as set forth in claim 1; and
an analyzing portion for analyzing a sample introduced from the sample introducing device.

* * * * *